US011077414B2

(12) United States Patent
Peacock

(10) Patent No.: US 11,077,414 B2
(45) Date of Patent: Aug. 3, 2021

(54) FINGER MANIPULATED MIXING DEVICE

(71) Applicant: Mark D. Peacock, Jacksonville, FL (US)

(72) Inventor: Mark D. Peacock, Jacksonville, FL (US)

( * ) Notice: Subject to any disclaimer, the term of this patent is extended or adjusted under 35 U.S.C. 154(b) by 172 days.

(21) Appl. No.: 15/373,160

(22) Filed: Dec. 8, 2016

(65) Prior Publication Data
US 2017/0165622 A1     Jun. 15, 2017

Related U.S. Application Data

(60) Provisional application No. 62/264,929, filed on Dec. 9, 2015.

(51) Int. Cl.
*B01F 13/00*     (2006.01)
*A47J 43/10*     (2006.01)

(52) U.S. Cl.
CPC ........... *B01F 13/0033* (2013.01); *A47J 43/10* (2013.01); *B01F 13/002* (2013.01)

(58) Field of Classification Search
CPC ............................ B01F 7/001; B01F 13/0033; B01F 15/00506; B01F 13/002; B25G 1/00; B25G 1/002; B25G 1/005; B25G 1/04; B25G 1/043; B25G 1/06; B25G 1/063; B25G 1/102; A47J 43/28; A47G 21/18; A46B 5/02
USPC .......................... 366/130; D32/26; D7/300.2
See application file for complete search history.

(56) References Cited

U.S. PATENT DOCUMENTS

| | | | |
|---|---|---|---|
| 1,296,326 A | | 3/1919 | Scollon |
| 1,747,378 A | * | 2/1930 | McClure .................. A61C 5/68 |
| | | | 366/129 |
| 2,462,991 A | | 3/1949 | Palinkas |
| D240,389 S | * | 7/1976 | Merry ........................... D7/664 |
| 4,659,125 A | * | 4/1987 | Chuan .................... A63B 47/02 |
| | | | 16/429 |
| D291,956 S | | 9/1987 | Fenner |
| 5,151,720 A | | 9/1992 | Kanbar |
| D438,056 S | * | 2/2001 | Lai .............................. D7/401.2 |
| 6,305,832 B1 | | 10/2001 | Huang |
| 6,408,524 B1 | * | 6/2002 | Lai ......................... A47G 21/02 |
| | | | 16/422 |
| 6,871,995 B2 | | 3/2005 | Simba |
| 7,213,965 B2 | * | 5/2007 | Daniels, Jr. ........... A47J 43/042 |
| | | | 366/192 |
| 7,513,678 B2 | | 4/2009 | Venus |
| 7,694,392 B2 | * | 4/2010 | Touchette ................ B25D 1/14 |
| | | | 16/430 |
| 2002/0124353 A1 | * | 9/2002 | Holland-Letz ......... B25G 1/102 |
| | | | 16/430 |

(Continued)

*Primary Examiner* — Elizabeth Insler
(74) *Attorney, Agent, or Firm* — Thomas C. Saitta

(57) ABSTRACT

A small, non-powered, handheld and finger-manipulated mixing device adapted for stirring or mixing liquids or liquid/solid combinations in relatively small volume containers. The mixing device has an elongated rod-like main body with an agitation member disposed on its distal end. The main body is provided with a bounded shaft segment that is bounded proximally and distally by transition shoulders of greater diameter than the bounded shaft segment, thus providing a region to receive the thumb and finger of the user to spin the main body, with the transition shoulders preventing excessive movement in the axial direction during rotation.

10 Claims, 2 Drawing Sheets

(56) References Cited

U.S. PATENT DOCUMENTS

2006/0218752 A1\* 10/2006 Potempa ............. B05C 17/0205
                                                    16/429
2011/0042497 A1\* 2/2011 Silvers ................. A47G 21/023
                                                    241/101.8

\* cited by examiner

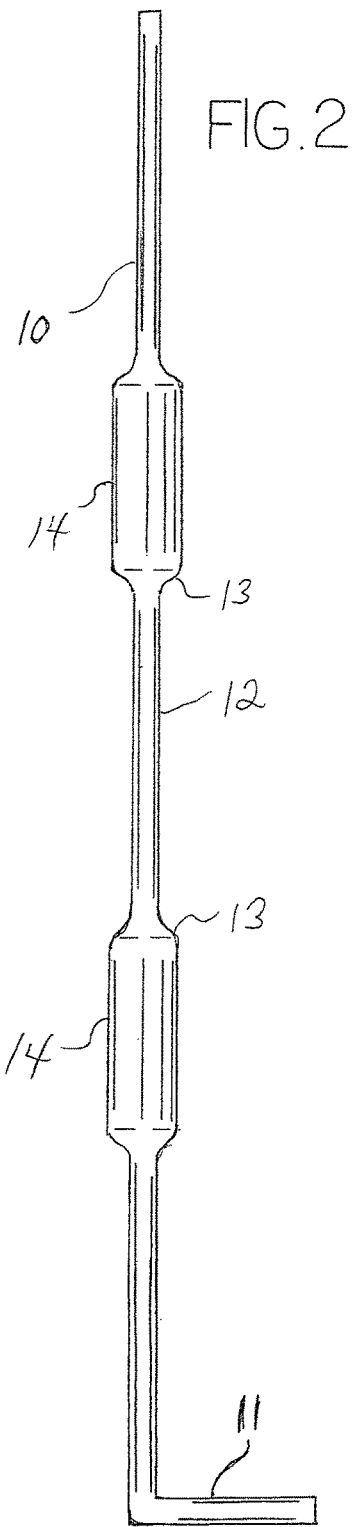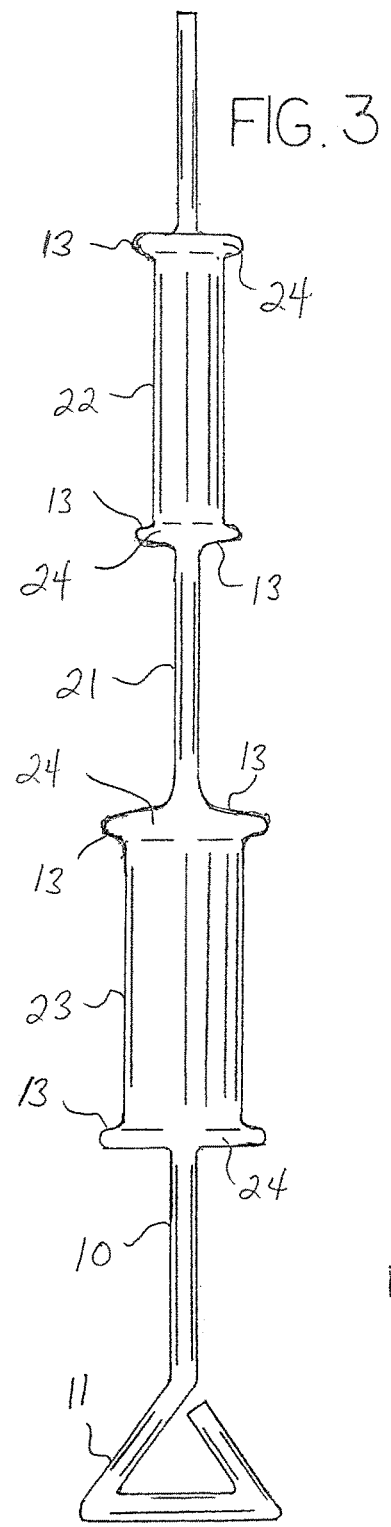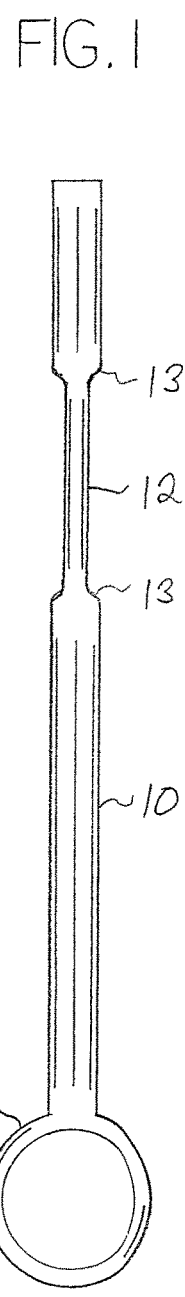

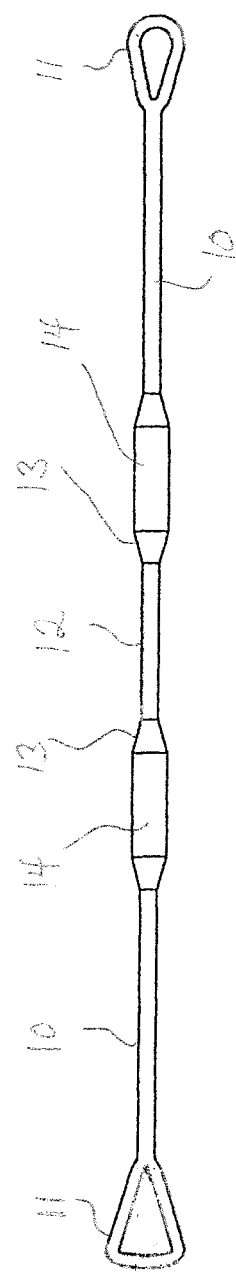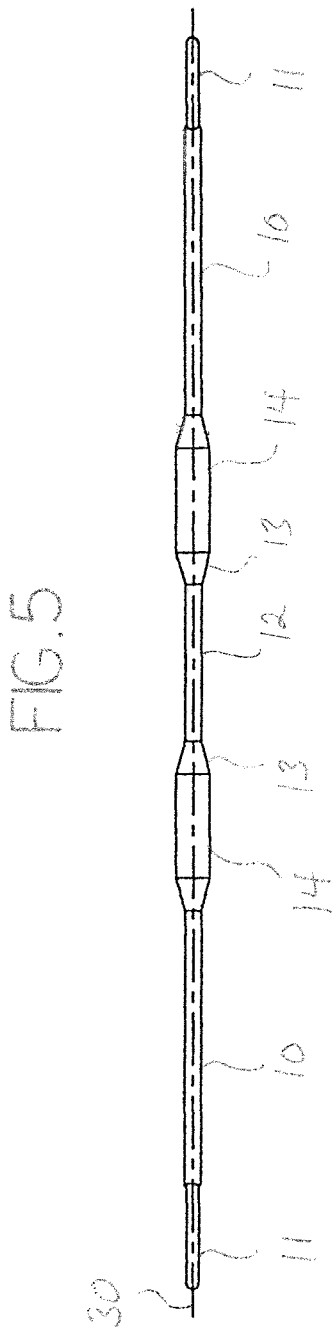
FIG. 4
FIG. 5

FINGER MANIPULATED MIXING DEVICE

This application claims the benefit of U.S. Provisional Patent Application Ser. No. 62/264,929, filed Dec. 9, 2015.

BACKGROUND OF THE INVENTION

This invention relates generally to the field of mixing or stirring devices, and more particularly relates to such devices that are non-powered and manually operated. Even more particularly, the invention relates to such mixing or stirring devices that are suitable for mixing small quantities of liquid.

There are many known devices for mixing or stirring a liquid, a combination of liquids or a combination of liquids and solids within a container. For relatively large containers, powered devices that rotate one or more agitating members inserted into the container are typically utilized, an example being a handheld electric kitchen mixer wherein a motor rotates a pair of mixing or agitating blades. Likewise, the mixing of relatively viscous or thick liquids often requires a powered mixing device.

There are also situations where relatively small amounts of liquids or liquid and powder combinations must be mixed. For example, in the field of tattooing, it is necessary to mix quantities of ink that may total less than a fluid ounce in very small containers. In such circumstances, powered mixers are not suitable and recourse is often made to using toothpicks, short wires, partially straightened paperclips, etc.

It is an object to address the problems discussed above by providing a small, non-powered, handheld and finger-manipulated mixing device that is suitable for efficiently mixing small quantities of liquid or liquid/solid combinations in small containers.

BRIEF DESCRIPTION OF THE DRAWINGS

FIG. 1 is a plan view of a first embodiment of the finger-manipulated mixing device.

FIG. 2 is a plan view of an alternative embodiment of the finger-manipulated mixing device, showing the primary bounded shaft segment bounded by two enlarged shaft segments.

FIG. 3 is a plan view of another alternative embodiment of the finger-manipulated mixing device, showing three bounded shaft segments, each with a different diameter.

FIG. 4 is a plan view of an alternative embodiment of the finger-manipulated mixing device, similar to that of FIG. 1, but having dual agitation members.

FIG. 5 is an edge view of the embodiment of FIG. 4.

BRIEF SUMMARY OF THE INVENTION

In general, the finger manipulated mixing device is a small, non-powered, handheld and finger manipulated mixing device adapted for stirring or mixing liquids or liquid/solid combinations in relatively small volume containers, such as for example plastic cups with diameters of approximately one inch or smaller and having a volume of less than several fluid ounces. The mixing device generally comprises an elongated, small diameter main body with one or more agitation members disposed on the ends of the main body, the agitation members being physical configurations capable of mixing a liquid when rotated. The main body is provided with a centralized primary bounded shaft segment that is bounded proximally and distally by transition shoulders of greater diameter than the bounded shaft segment. The longitudinal dimension of the primary bounded shaft segment is approximately 0.75 to 1.5 inches, i.e., slightly larger than average width of a human finger, such that device is used for mixing liquids and liquid/solid combinations by gripping and spinning the primary bounded shaft portion between the thumb and the fore or middle finger. Relative movement of the finger and thumb in a back and forth manner results in rotation of the mixing device about the longitudinal axis of the main body. The transition shoulders may abut the finger and thumb proximally and distally to prevent excessive movement of the preprimary bounded shaft segment in either axial direction during rotation, such that control of the mixing device is easily maintained. Other segments of the main body may be provided with diameters that are larger or smaller than the diameter of the primary bounded shaft segment, such that the rate of rotation of the agitation member may be increased or decreased upon application of the back and forth finger and thumb motion at the same speed by gripping a segment of different diameter. Proximal or distal flanges, similar in function to the transition shoulders, may be provided to bound the multiple bounded shaft portions to restrain movement in the axial direction during axial rotation.

In alternative terminology, the invention is a handheld, non-powered, finger manipulated mixing device comprising: an elongated main body having a distal end; an agitation member disposed on said distal end of said main body; a primary bounded shaft segment, said primary bounded shaft segment adapted to be gripped between a thumb and finger of a user; and transition shoulders bounding said primary bounded shaft segment; whereby said agitation member is rotated by a user gripping said primary bounded shaft segment between the user's thumb and finger and moving the thumb and finger in a back and forth motion; and further whereby said transition shoulders define restricting members limiting axial movement of said primary bounded shaft segment relative to the user's thumb and finger. Furthermore, such a device wherein said transition shoulders are angled or curved away from said primary bounded shaft segment; wherein said transition shoulders have beveled or radiused edges; said main body having a diameter and said primary bounded shaft segment having a diameter, wherein the diameter of said primary bounded shaft segment is smaller than the diameter of said main body; said main body having a diameter and said primary bounded shaft segment having a diameter, wherein the diameter of said primary bounded shaft segment is equal to the diameter of said main body; said main body having a diameter and said primary bounded shaft segment having a diameter, wherein the diameter of said primary bounded shaft segment is greater than the diameter of said main body; wherein said main body is approximately 5 to 7 inches in length; wherein said primary bounded shaft segment is approximately 0.75 to 1.5 inches in length; wherein said primary bounded shaft segment is approximately 0.06 to 0.1 inches in diameter; further comprising enlarged shaft segments disposed on said main body and defining said transition shoulders, said enlarged shaft segments having a diameter greater than the diameter of said primary bounded shaft segment and said main body; further comprising a secondary bounded shaft segment having a diameter greater than the diameter of said primary bounded shaft segment, said secondary bounded shaft segment bounded by annular flanges, said annular flanges defining transition shoulders for said secondary bounded shaft segment; further comprising a secondary bounded shaft segment having a diameter greater than the diameter of said primary bounded shaft segment and a tertiary bounded shaft segment having a diameter greater than the diameter of said primary bounded shaft segment, said secondary bounded shaft segment and said tertiary bounded shaft segment bounded by annular flanges, said annular flanges defining transition shoulders for said secondary bounded shaft segment and said tertiary bounded shaft segment; and/or wherein said primary bounded shaft segment is centrally disposed between said secondary bounded shaft segment and aid tertiary bounded shaft segment.

Alternatively still, a finger manipulated mixing device comprising: an elongated main body having ends; at least one agitation member disposed on at least one of said ends of said main body; a primary bounded shaft segment having a diameter and a length of approximately 0.75 to 1.5 inches, said primary bounded shaft segment being centrally located on said main body; transition shoulders bounding said primary bounded shaft segment, said transition shoulders having a diameter greater than the diameter of said primary bounded shaft segment; whereby said agitation member is rotated by a user gripping said primary bounded shaft segment between the user's thumb and finger and moving the thumb and finger in a back and forth motion; and further whereby said transition shoulders define restricting members limiting axial movement of said primary bounded shaft segment relative to the user's thumb and finger. Furthermore, such a device wherein said transition shoulders are angled or curved away from said primary bounded shaft segment and have beveled or radiused edges; said main body having a diameter and wherein the diameter of said primary bounded shaft segment is different from the diameter of said main body; wherein said primary bounded shaft segment is approximately 0.06 to 0.1 inches in diameter; further comprising enlarged shaft segments disposed on said main body and defining said transition shoulders, said enlarged shaft segments having a diameter greater than the diameter of said primary bounded shaft segment; further comprising a secondary bounded shaft segment having a diameter greater than the diameter of said primary bounded shaft segment, said secondary bounded shaft segment bounded by annular flanges, said annular flanges defining transition shoulders for said secondary bounded shaft segment; and/or further comprising a secondary bounded shaft segment having a diameter greater than the diameter of said primary bounded shaft segment and a tertiary bounded shaft segment having a diameter greater than the diameter of said primary bounded shaft segment, said secondary bounded shaft segment and said tertiary bounded shaft segment bounded by annular flanges, said annular flanges defining transition shoulders for said secondary bounded shaft segment and said tertiary bounded shaft segment.

DETAILED DESCRIPTION OF THE INVENTION

With reference to the drawings, the finger manipulated mixing device in various embodiments will be discussed in detail. The embodiments illustrated in the drawings are not meant to be restrictive. The term "finger manipulated" is defined and used herein to mean rotation of a device about its longitudinal axis by back and forth motion of the user's thumb and finger.

FIG. 1 illustrates a basic embodiment of the small, non-powered, handheld and finger manipulated mixing device designed, structured and adapted for stirring or mixing liquids or liquid/solid combinations in relatively small volume containers. For example, the art of tattooing requires small quantities of ink, usually less than two fluid ounces, to be mixed in small plastic cups less than approximately one inch in diameter. Such small volume containers require small tools, and manipulation of the small tools is difficult.

The mixing device generally comprises an elongated, rod-shaped, circular-in-cross-section main body 10 with an agitation member 11 disposed on its distal end. The length of the main body 10 may vary, but a length of approximately 5 to 7 inches has proven to be satisfactory. This length allows the user to rest his or her hand on a surface while spinning the device. The agitation member 11 is a structural member that agitates the liquid being mixed when the primary shaft 10 is rotated or spun back and forth about its longitudinal axis, such rotation causing the agitation member 11 to spin within the liquid container. The agitation member 11 is not restricted to any particular shape, several representative configurations being shown in the illustrations, and may be formed by bending or otherwise manipulating the distal end of the main body 10. The mixing device may be provided with a pair of agitation members 11, one on each end of the main body 10, as shown in FIGS. 4 and 5.

The main body 10 is provided with a centrally located, primary bounded shaft segment 12 that is bounded proximally and distally by transition shoulders 13, the transition shoulders 13 extending in the direction radially outward from the primary bounded shaft segment 12. The term "bounded shaft segment" is defined and used herein to denote the segment of the device that is gripped between the finger and thumb of the user in order to impart rotational movement to the main body 10. Transition shoulders 13 are preferably angled or curved away from the primary bounded shaft segment, the transition shoulders 13 being of greater diameter than the bounded shaft segment 12 and most preferably having beveled or radiused edges so as to reduce the likelihood of the transition shoulders 13 from biting into latex gloves worn by the user. In the embodiment of FIG. 1, the primary bounded shaft segment 12 has a diameter greater than the primary shaft 10, but it is also possible to provide the device with a primary bounded shaft segment 12 of equal or lesser diameter than the main body 10. The bounded shaft segment 12 is approximately from 0.75 to 1.5 inches long, a dimensional range chosen for being slightly larger than average finger width, since device is used for mixing liquids and liquid/solid combinations by gripping and spinning the primary bounded shaft segment 12 between the thumb and the fore or middle finger. If the primary bounded shaft segment 12 is too short, the transition shoulders 13 will tend to catch on the latex gloves worn by the user, especially if the gloves are loose.

Relative movement of the finger and thumb in a back and forth manner results in rotation of the primary bounded shaft segment 12 of the mixing device about the longitudinal axis 30 of the main body 10, thereby rapidly spinning the agitation member 11. The transition shoulders 13 are restrictive members that will abut the finger and thumb proximally and distally as needed to restrict excessive movement of the primary shaft 10 relative to the thumb and finger of the user in either axial direction, such that control of the mixing device is easily maintained. The transition shoulders 13 are preferably curved or rounded rather than being provided with relatively sharp edges, as sharp edges may bite into the finger or thumb and cause the mixing device to shift in the axial direction. The rounded edges of the transition shoulders 13 act to self-center the mixing device, such that the bounded shaft segment 12 remains centered between the thumb and finger during rotation.

In an alternative embodiment (not illustrated), the primary bounded shaft segment 12 may have a larger diameter than the main body 10, in which case the primary bounded shaft segment 12 is defined by annular flanges 24 disposed between the primary bounded shaft segment 12 and the main body 10, similar in construct to those illustrated in FIG. 3. In essence this embodiment is the reverse of that shown in FIG. 1, with the annular flanges 24 performing the same axially restrictive function as the transition shoulders 13.

In the embodiment illustrated in FIG. 2, the primary bounded shaft segment 12 and the main body 10 have approximately equal diameters. The primary bounded shaft segment 12 and the transition shoulders 13 are defined by two enlarged shaft segments 14 disposed on the main body 10, each having a diameter greater than the diameters of the primary bounded shaft segment 12 or the main body 10.

FIG. 3 illustrates another embodiment of the mixing device. In this embodiment, the main body 10 is provided with multiple bounded shaft segments 21/22/23, each such bounded shaft segment having a different diameter. In the embodiment shown, bounded shaft segment 21 has the smallest diameter, bounded shaft portion 23 has the largest diameter, and the diameter of bounded shaft portion 22 is in between, such that segment 21 is the primary bounded shaft segment and segments 22/23 are secondary and tertiary bounded shaft segments, respectively. With this structure the rate of rotation of the agitation member 11 may be increased or decreased depending upon which bounded shaft portion 21/22/23 is grasped between the finger and thumb, without requiring the user to increase or decrease the speed of the back and forth motion of the thumb and finger, which results in better control of the mixing device. Proximal and distal annular flanges 24 are provided at the junctions of the larger diameter bounded shaft portions 22 and 23 with the main body 10. In this design the annular flanges 24 define the transition shoulders 13 of the bounded shaft segments 21/22/23.

While dimensions may vary, it is most preferred that the primary bounded shaft segment 21 has a diameter of approximately 0.08 inch (2 mm), with a preferred dimensional range for the primary bounded shaft segment of from approximately 0.06 to 0.1 inches (1.5 to 2.5 mm).

With the mixing device as discussed, mixing small volumes of liquids or liquid/solid combinations in a small container is easily accomplished, the design and structure of the mixing device providing better gripping and control than would be present with a simple elongated cylindrical member.

It is to be understood that equivalents and substitutions for some elements set forth above may be obvious to those of ordinary skill in the art, and therefore the true scope and definition of the invention is to be as set forth in the following claims. The illustrations and representative examples are not meant to be limiting.

The invention claimed is:

1. A handheld, non-powered, finger manipulated mixing device comprising:
   an elongated, circular-in-cross-section main body having a distal end, wherein said main body is approximately 5 to 7 inches in length;
   an agitation member disposed on said distal end of said main body;
   a circular-in-cross-section primary bounded shaft segment, said primary bounded shaft segment adapted to be gripped between a thumb and finger of a user, wherein said primary bounded shaft segment is approximately 0.75 to 1.5 inches in length and approximately 0.06 to 0.1 inches in diameter;
   a pair of enlarged shaft segments, said primary bounded shaft being positioned between said enlarged shaft segments; and
   transition shoulders positioned on each of said enlarged shaft segments, two of said transition shoulders bounding said primary bounded shaft segment and two of said transition shoulders bounding said main body;
   whereby said agitation member is rotated by a user gripping said primary bounded shaft segment between the user's thumb and finger and moving the thumb and finger in a back and forth motion; and further whereby said two transition shoulders bounding said primary bounded shaft segment define restricting members limiting axial movement of said primary bounded shaft segment relative to the user's thumb and finger.

2. The device of claim 1, wherein said transition shoulders are angled or curved away from said primary bounded shaft segment and from said main body.

3. The device of claim 2, wherein said transition shoulders have beveled or radiused edges.

4. The device of claim 1, said main body having a diameter and said primary bounded shaft segment having a diameter, wherein the diameter of said primary bounded shaft segment is smaller than the diameter of said main body.

5. The device of claim 1, said main body having a diameter and said primary bounded shaft segment having a diameter, wherein the diameter of said primary bounded shaft segment is equal to the diameter of said main body.

6. The device of claim 1, said main body having a diameter and said primary bounded shaft segment having a diameter, wherein the diameter of said primary bounded shaft segment is greater than the diameter of said main body.

7. The device of claim 1, said enlarged shaft segments having a diameter greater than the diameter of said primary bounded shaft segment and said main body.

8. The device of claim 1, said main body further comprising a proximal end, and wherein an agitation member is disposed on said proximal end of said main body, said proximal end agitation member having a different configuration than said distal end agitation member.

9. A method of mixing tattoo ink comprising the steps of:
   covering a user's hand with a latex glove;
   providing a liquid container smaller than two ounces in volume;
   pouring a quantity of liquid tattoo ink into said liquid container;
   providing a handheld, non-powered, finger manipulated mixing device comprising:
      an elongated, circular-in-cross-section main body having a distal end, wherein said main body is approximately 5 to 7 inches in length;
      an agitation member disposed on said distal end of said main body;
      a circular-in-cross-section primary bounded shaft segment, said primary bounded shaft segment adapted to be gripped between a thumb and finger of a user, wherein said primary bounded shaft segment is approximately 0.75 to 1.5 inches in length and approximately 0.06 to 0.1 inches in diameter;
      a pair of enlarged shaft segments, said primary bounded shaft being positioned between said enlarged shaft segments; and
      transition shoulders positioned on each of said enlarged shaft segments, two of said transition shoulders bounding said primary bounded shaft segment and two of said transition shoulders bounding said main body;

whereby said agitation member is rotated by a user gripping said primary bounded shaft segment between the user's thumb and finger and moving the thumb and finger in a back and forth motion; and further whereby said two transition shoulders bounding said primary bounded shaft segment define restricting members limiting axial movement of said primary bounded shaft segment relative to the user's thumb and finger;

gripping said mixing device on said primary bounded shaft segment with the user's thumb and finger, inserting said distal end into said liquid tattoo ink within said liquid container, and rotating in a back and forth motion said primary bounded shaft segment between the user's thumb and finger to mix said liquid tattoo ink.

10. The method of claim 9, wherein said step of providing a handheld, non-powered, finger manipulated mixing device further comprises providing said device wherein said main body further comprises a proximal end, and wherein an agitation member is disposed on said proximal end of said main body, said proximal end agitation member having a different configuration than said distal end agitation member; and further comprising the step of inserting either said distal end agitation member or said proximal end agitation member into said liquid tattoo ink with said liquid chamber.

\* \* \* \* \*